Alfred G. Bade
INVENTOR.

ATTORNEY

Dec. 28, 1948.   A. G. BADE   2,457,431
VARIABLE SPEED TRANSMISSION
Filed Sept. 30, 1944   2 Sheets-Sheet 2

Alfred G. Bade
INVENTOR.

BY
ATTORNEY.

Patented Dec. 28, 1948

2,457,431

UNITED STATES PATENT OFFICE 2,457,431

VARIABLE-SPEED TRANSMISSION

Alfred G. Bade, Wauwatosa, Wis., assignor to The Falk Corporation, Milwaukee, Wis., a corporation of Wisconsin Application September 30, 1944, Serial No. 556,524

7 Claims. (Cl. 74—281)

1

This invention relates to variable speed transmissions of the type disclosed in my copending application, Serial No. 471,116, filed January 2, 1943, now abandoned.

Variable speed transmissions of this type commonly involve a set of tapered, inclined, planet rollers which are normally urged into pressure contact with an encircling control ring. In such transmissions variations in speed are effected by shifting the control ring in a direction lengthwise of the rollers, an adjustment that is readily performed during operation of the unit. But the normal contact pressures between the rollers and ring interfere with such adjustment when the unit is at rest.

One object of the present invention is to provide means for releasing the pressures between the rollers and control ring in transmissions of the type mentioned in order to permit speed changing adjustment while the unit is at rest.

Other more specific objects and advantages will appear, expressed or implied, from the following description of an illustrative embodiment of the present invention.

In the accompanying drawings—

Figure 1:
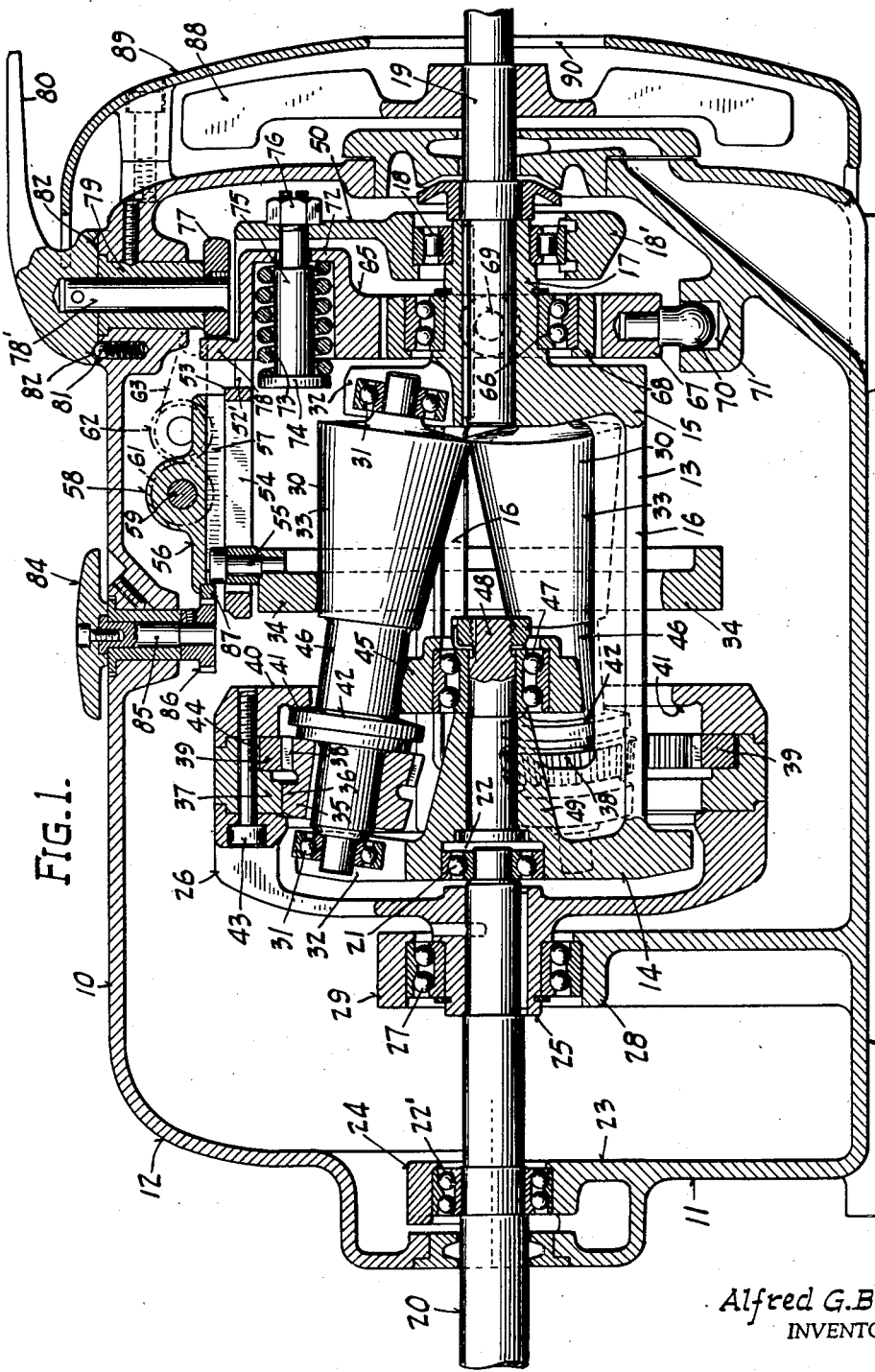
Figure 1 is a longitudinal sectional view of a variable speed transmission constructed in accordance with the present invention.
Figure 2:
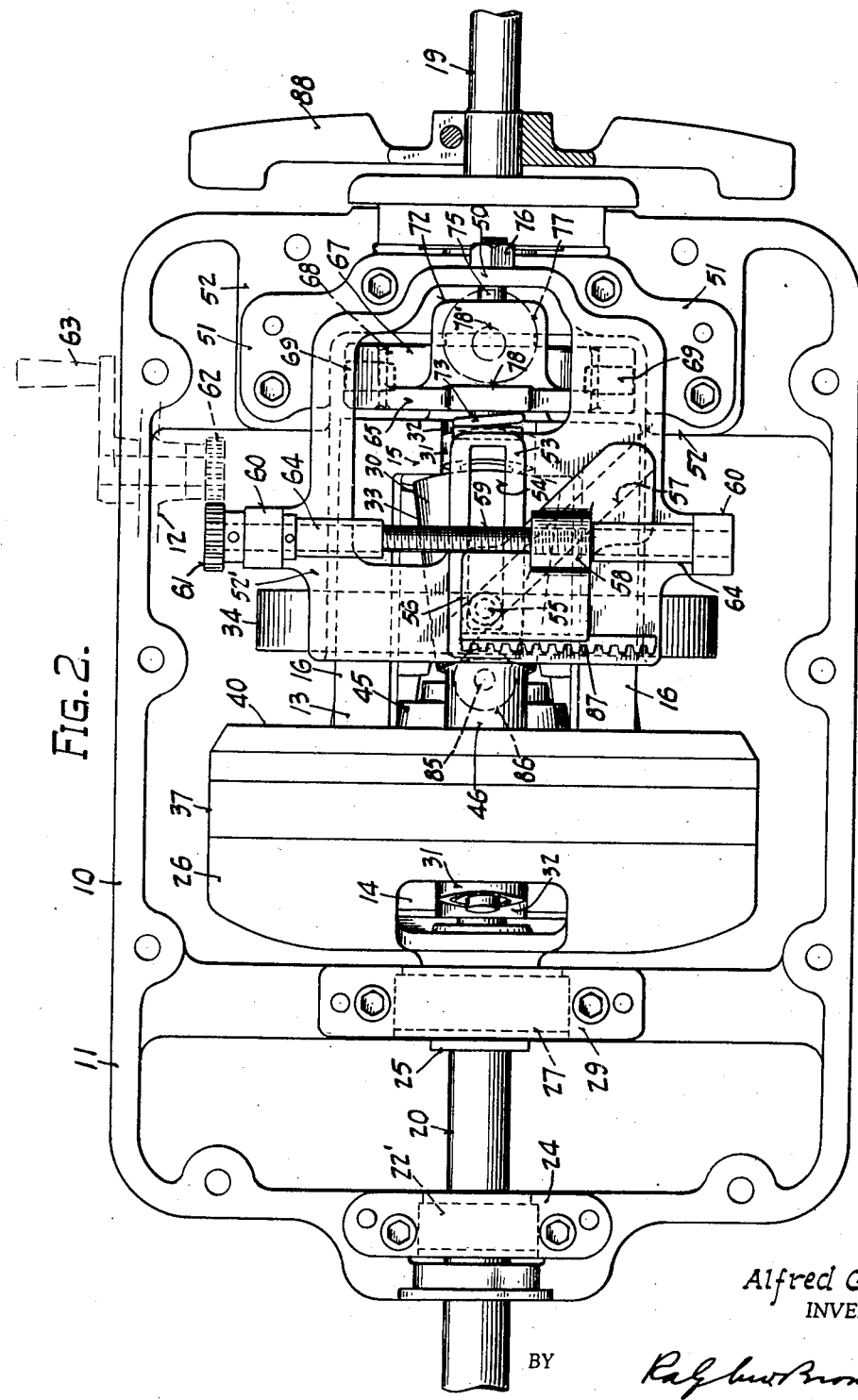
Fig. 2 is a plan view with the upper half of the housing removed.

The variable speed transmission selected for illustration is shown enclosed in a housing 10 horizontally split in a mid-plane to provide a lower base section 11 and a removable cover section 12. The lower base section 11 of the housing provides support for all of the essential parts of the transmission so that the cover section 12 may be removed without disturbing or impairing the functioning thereof.

In this instance the transmission includes a rotary cage 13 having a pair of end heads 14 and 15 integrally connected by a set of peripherally spaced longitudinal bars 16. One end of the cage is supported by a hollow trunnion 17 projecting from the end head 15 and journalled in a bearing 18 in a bearing support 18' fixed to the base section 11 in a manner to be later described. The cage 13 is driven by a shaft 19 keyed or otherwise fixed in and supported by the hollow trunnion 17. The opposite end of the cage 13 is supported by the inner end of a driven shaft 20 through a bearing 21 carried by the latter and seated within a cylindrical recess 22 formed in the center of the end head 14.

The driven shaft 20 is journalled in a bearing

2

22' seated in a bearing support 23 carried by the base section 11 of the housing and including a removable cover section 24. The shaft 20 is also keyed or otherwise fixed to the hub 25 of a driven ring 26, the hub 25 being journalled in a bearing 27 seated in a bearing support 28 provided in the base section 11 and having a removable cover 29.

The cage 13 serves as a retainer and driver for a set of inclined planet rollers 30, preferably three in number, each being equipped at opposite ends with suitable bearings 31, closely guided in radial slots 32 formed in the end heads 14 and 15. Each roller is fashioned at one end to provide a tapered section 33 for rolling contact with an encircling control ring 34 to be hereinafter further described. A collar 35, keyed or otherwise fixed to the opposite end of each roller, is shaped to provide a roller 36 for rolling contact with a ring 37 carried by the driven ring 26 and also shaped to provide a pinion 38 that meshes with an internal ring gear 39 also carried by the driven ring 26. Another ring 40 carried by the driven ring 26 is fashioned to provide an inwardly directed annular shoulder 41 for contact with annular shoulders 42 provided on the several rollers 30 to retain the latter against longitudinal displacement.

In this instance the rings 37 and 40 are secured to the driven ring 26 by appropriate means, such as bolts 43, the ring gear 39 being loosely confined between the rings 37 and 40 and retained against rotation relative thereto by the bolts 43 which are loosely engaged in appropriate slots 44 formed in the outer periphery of the ring gear. Mounted in the manner described, the ring gear 39 has sufficient freedom to automatically center itself with respect to the set of pinions 38 with which it is engaged.

The several rollers 30 are normally urged outwardly by a central ring 45 so as to develop the desired pressure contacts between their tapered sections 33 and the control ring 34 and between the rings 36 thereof and the ring 37. In this instance the central ring 45 is in rolling contact with an intermediate portion 46 of each roller and is shown carried by a bearing 47 fixed on the end of a pintle 48 mounted in the inwardly projecting hub portion 49 of the cage end head 14.

The cage and the ring 45 carried thereby are axially movable, the cage end head 14 being axially movable on its bearing 21 and the inner race ring and rollers of the bearing 18 being axially movable within its outer race ring for that purpos. The cage 13 is normally urged toward the right (Fig. 1) by means to be later described so that the ring 45 normally reacts against the several inclined rollers 30 to urge the same outwardly for the purpose hereinabove noted.

The bearing support 18' in this instance constitutes an integral part of an upright structure 50 having a horizontal mounting flange 51 seated upon and bolted or otherwise rigidly attached to a pair of laterally spaced shelf formations 52 formed within the base section 11 of the housing. The structure 50 also provides support for an open horizontal frame 52' integral therewith and overlying the tapered sections 33 of the rollers and the control ring 34. The frame 52' includes an element 53 containing a slot 54 extending parallel to the axis of rotation of the cage 13. A pin 55 projecting radially from the control ring 34 extends through the slot 54 and is closely fitted therein to retain the ring 34 against rotation. The pin 55 also coacts with means operable to shift the same lengthwise of the slot 54 to thereby effect a speed-changing adjustment of the control ring 34 along the rollers 30. The means shown for this purpose will now be described.

A plate 56 slidable seated upon the horizontal frame 52' contains a diagonally disposed channel 57 formed in its under side and in which the projecting end of the pin 55 is slidably engaged. The plate 56 carries an integral nut 58 which is threaded on an actuating screw shaft 59 that extends transversely of and above the slotted element 53. The shaft 59 is shown journalled at opposite ends in lugs 60 carried by the frame 52' and equipped with an actuating gear 61 attached to one end thereof. The arrangement is such that by rotating the gear 61 and shaft 59 the plate 56 may be moved transversely of the slotted element 53 to thereby shift the pin 55 and ring 34 lengthwise of the slot 54 as a result of the reaction of the diagonal channel 57 upon the pin 55.

The gear 61 and shaft 59 may be rotated and controlled by any appropriate means, such as a meshing gear 62 carried by the cover 12 and operated by a crank 63 or the like. Sleeves 64 mounted on the shaft 59 adjacent the supporting lugs 60 serve as stops to limit the travel of the plate 56 and consequently of the pin 55 and control ring 34.

In the transmission shown the cage 13 and ring 45 are normally urged toward the right (Fig. 1) by mechanism now to be described and comprising an upright lever structure 65 mechanically connected to the trunnion 17 of the cage through a combined journal and thrust bearing 66 axially fixed on the trunnion. The lever 65 includes a ring formation 67 that loosely encircles a ring 68 fixed to the outer race of the bearing 66. Two diametrically opposed horizontal pins 69 carried by the ring 67 are in swivel engagement with the ring 68 to provide support for the lever 65 and to also afford a thrust transmitting rockable connection between the lever and ring 68.

The lever structure 65 is equipped at its lower end with a round-headed stud 70 seated in a socketed member 71 formed in the base 11 of the housing to provide a fulcrum therefor. A hollow boss 72 carried by the upper portion of the lever constitutes a housing for a compression spring 73 which reacts against the head 74 of a tension bolt 75 that extends through the boss 72 and through the fixed upright structure 50 in which it is mounted.

The arrangement is such that the spring 73 normally reacts on the lever structure 65 to rock the same toward the right (Fig. 1) and this thrust, transmitted through the rings 67 and 68, bearing 66 and cage 13, forces the ring 45 against the several inclined rollers 30 in a manner to force the latter outwardly against the encircling rings 34 and 37. The thrust thus transmitted may be regulated by adjustment of the nut 76 on the tension bolt 75.

In the transmission shown provision is made for relieving the pressure between the several rollers 30 and ring 34 to permit ready adjustment of the latter along the rollers when the transmission is at rest. For this purpose a cam 77 is provided disposed to act against the upper end 78 of the lever structure 65 in a manner to shift the latter against the thrust of the spring 73 and in a direction to shift the cage 13 and ring 45 toward the left (Fig. 1).

In this instance the pressure releasing cam 77 is shown carried by a shaft 78' journalled in a bushing 79 detachably fixed in the housing cover 12 and equipped with an appropriate operating lever 80. A spring loaded ball 81 functioning at a detent, coacts with one or the other of two sockets 82 provided in the hub of the lever 80 to yieldably retain the latter in either of two positions. In the position shown the cam 77 is ineffective and does not interfere with the normal action of the spring 73, but by rotating the lever 80 and cam 77 through a half turn from the position shown the cage 13 and ring 45 are thereby axially shifted to a position where the pressures between the rollers 30 and ring 34 are entirely relieved.

Provision is also preferably made for visibly indicating the position of the control ring 34 in all of its positions of adjustment. For that purpose an indicator dial 84 is mounted on the housing cover 12, the dial being carried by a shaft 85 equipped at its lower end with a pinion 86 that meshes with a rack 87 carried by and movable with the plate 56. Since the extent of movement of the plate 56 corresponds at all times with the extent of movement of the pin 55 and ring 30, the dial 84 thus actuated by the plate 56 will of course accurately register the position of the ring 34 at all times.

The transmission shown is also equipped with a cooling device in the form of a centrifugal fan 88 carried by the drive shaft 19 and contained within a dished shield 89 attached to the end of the housing. The shield is provided with an air admission opening 90 at its center and is shaped to direct a blast of air from the fan 88 lengthwise of and over the external surfaces of the housing.

Various changes may be made in the embodiment of the invention hereinabove specifically described without departing from or sacrificing the advantages to the invention as defined in the appended claims.

I claim:

1. In a variable speed transmission the combination of a housing horizontally split to form a base portion and a separable cover portion, a cage rotatable in said housing, means including bearings carried by said base portion for supporting said cage independently of said cover portion, a set of inclined planet rollers mounted for rotation with and with respect to said cage, a ring encircling said rollers and in rolling contact therewith, means carried by said base portion independently of said cover portion for shifting said ring relative to said rollers to vary the speed ratio of the transmission, and means carried by said cover portion and operable from a point externally of said housing for actuating said last named means.

2. In a variable speed transmission the combination of a housing horizontally split to form a base portion and a separable cover portion, a rotary cage supported by said base portion independently of said cover portion, a set of inclined planet rollers mounted for rotation with and with respect to said cage, a control ring encircling said set of rollers and in rolling contact therewith, means supported by said base portion independently of said cover portion for holding said ring against rotation, and means supported by said base portion independently of said cover portion for shifting said ring lengthwise of said rollers to vary the speed ratio of the transmission.

3. In a variable speed transmission the combination of a housing, a set of relatively inclined planet rollers therein, a control ring encircling said rollers and adjustable lengthwise thereof to vary the speed ratio of the transmission, means for forcing said rollers against said ring, spring urged lever mechanism within said housing normally operable on said last named means to maintain pressure contact between said rollers and ring, and means operable on said mechanism from a point externally of said housing to relieve the pressure between said rollers and ring.

4. In a variable speed transmission the combination of a set of relatively inclined planet rollers, a control ring encircling said rollers and adjustable lengthwise thereof to vary the speed ratio of the transmission, means for forcing said rollers against said ring, spring urged lever mechanism normally operable on said last named means to maintain pressure contact between said rollers and ring, and cam means operable on said mechanism to effect quick release of the pressures between said rollers and ring.

5. In a variable speed transmission the combination of a set of relatively inclined planet rollers, a control ring encircling said rollers and adjustable lentghwise thereof to vary the speed ratio of the transmission, means including a resiliently urged level normally effective to maintain pressure contacts between said rollers and ring, and means operable on said lever to effect quick release of the pressures between said rollers and ring.

6. In a variable speed transmission the combination of a set of relatively inclined planet rollers, a control ring encircling said rollers and adjustable lengthwise thereof to vary the speed ratio of the transmission, means for forcing said rollers against said ring, a lever operatively engaged with said last named means, a fixed fulcrum for one end of said lever, and resilient means acting on the other end of said lever to normally maintain said rollers in pressure contact with said ring.

7. In a variable speed transmission the combination of a set of relatively inclined planet rollers, a control ring encircling said rollers and adjustable lengthwise thereof to vary the speed ratio of the transmission, means for forcing said rollers against said ring, a lever operatively engaged with said last named means, a fixed fulcrum for one end of said lever, resilient means acting on the other end of said lever to normally maintain said rollers in pressure contact with said ring, and means for nullifying the effect of said resilient means to thereby release the pressure between said rollers and ring.

ALFRED G. BADE.

REFERENCES CITED

The following references are of record in the file of this patent:

UNITED STATES PATENTS

| Number | Name | Date |
|---|---|---|
| 2,109,695 | Graham | Mar. 1, 1938 |
| 2,168,274 | Schmitter | Aug. 1, 1939 |
| 2,238,801 | Schmitter | Apr. 15, 1941 |
| 2,255,200 | Wahl | Sept. 9, 1941 |
| 2,275,243 | Bade | Mar. 3, 1942 |